United States Patent
Chou (10) Patent No.: US 10,852,856 B2
(45) Date of Patent: Dec. 1, 2020

(54) COMPUTER INPUT APPARATUS AND INPUT METHOD THEREOF

(71) Applicant: HADES-GAMING CORP., New Taipei (TW)

(72) Inventor: Hung-Jen Chou, New Taipei (TW)

(73) Assignee: HADES-GAMING CORP., New Taipei (TW)

( * ) Notice: Subject to any disclaimer, the term of this patent is extended or adjusted under 35 U.S.C. 154(b) by 0 days.

(21) Appl. No.: 15/458,157

(22) Filed: Mar. 14, 2017

(65) Prior Publication Data

US 2018/0267630 A1 Sep. 20, 2018

(51) Int. Cl.
*G06F 3/039* (2013.01)
*G06F 3/038* (2013.01)
*G06F 3/0354* (2013.01)
*G06F 3/0481* (2013.01)

(52) U.S. Cl.
CPC .......... *G06F 3/0383* (2013.01); *G06F 3/0395* (2013.01); *G06F 3/03543* (2013.01); *G06F 3/0481* (2013.01)

(58) Field of Classification Search
CPC ......... G06F 3/00–047; G06F 3/03–033; G06F 3/03541; G06F 3/03543; G06F 3/039; G06F 3/0395; G06F 3/0383; G06F 3/0481
See application file for complete search history.

(56) References Cited

U.S. PATENT DOCUMENTS

| | | | | |
|---|---|---|---|---|
| 6,303,924 B1 * | 10/2001 | Adan | ..................... | G06F 3/0317 250/206.1 |
| 2002/0044134 A1 * | 4/2002 | Ericson | ................. | G06F 3/0317 345/163 |
| 2004/0239615 A1 * | 12/2004 | Firebaugh | ............. | G06F 3/0395 345/156 |
| 2006/0294247 A1 * | 12/2006 | Hinckley | ................ | G06F 3/038 709/228 |
| 2007/0002022 A1 * | 1/2007 | Joung | ................... | G06F 3/0317 345/166 |
| 2009/0156123 A1 * | 6/2009 | Kim | .................... | H04M 1/7253 455/41.2 |
| 2010/0274906 A1 * | 10/2010 | Fuks | ..................... | G06F 3/0416 709/227 |
| 2010/0315350 A1 * | 12/2010 | Rene | ..................... | G06F 3/0395 345/173 |
| 2011/0175567 A1 * | 7/2011 | Kidakarn | ................ | G06F 1/266 320/108 |

(Continued)

*Primary Examiner* — Roberto W Flores (74) *Attorney, Agent, or Firm* — Li & Cai Intellectual Property (USA) Office (57) ABSTRACT

A computer input apparatus is used for making a host computer execute a start event according to an instruction of a mobile device. The computer input apparatus includes a mouse pad and an input device. The mouse pad includes a transmission section and an indication section. When the transmission section receives an indication signal from the mobile device, the indication section outputs a sensory signal sensible for humans. The input device has an actuation section. When the input device receives the actuation signal corresponding to the indication signal, the actuation section outputs a start signal to the host computer. Thereby, the host computer executes a start event according to the start signal.

3 Claims, 8 Drawing Sheets

(56) References Cited

U.S. PATENT DOCUMENTS

| | | | | |
|---|---|---|---|---|
| 2011/0304548 | A1* | 12/2011 | Yoshida | G06F 3/03543 345/166 |
| 2012/0194435 | A1* | 8/2012 | Tsai | G06F 3/0383 345/163 |
| 2013/0132624 | A1* | 5/2013 | Chen | G06F 13/4286 710/106 |
| 2013/0311329 | A1* | 11/2013 | Knudson | G06Q 50/01 705/26.9 |
| 2015/0002399 | A1* | 1/2015 | Tang | G06F 3/0317 345/166 |
| 2015/0116219 | A1* | 4/2015 | Cox | G06F 3/03543 345/163 |
| 2015/0301629 | A1* | 10/2015 | Chen | A63F 13/22 345/156 |
| 2016/0085322 | A1* | 3/2016 | Park | G06F 1/266 345/163 |
| 2018/0203525 | A1* | 7/2018 | Chang | G06F 3/0238 |

* cited by examiner

COMPUTER INPUT APPARATUS AND INPUT METHOD THEREOF

BACKGROUND OF THE INVENTION

1. Field of the Invention

The instant disclosure relates to an input device; in particular, to a computer input apparatus and an input method thereof.

2. Description of Related Art

Generally, a user needs to operate a computer input apparatus to make a host computer execute a certain program. Recently, mobile devices have been widely used, and the contents displayed by a mobile device may be relevant to certain programs installed in the host computer. When the user is using a host computer, such as his personal computer, he may not be able to notice newly pushed contents or newly received messages displayed on his mobile device. In this case, if the contents displayed by his mobile device are relevant to the certain program installed in his personal computer, the user may not be able to use his personal computer to make an immediate response.

SUMMARY OF THE INVENTION

The instant disclosure provides a computer input apparatus and an input method thereof, which make what is displayed by a mobile device relevant to the execution of a host computer.

The computer input apparatus provided by the instant disclosure is used for making a host computer execute a start event according to an instruction of a mobile device. The computer input apparatus comprises a mouse pad and an input device. The mouse pad has a transmission section and an indication section. When an indication signal provided by the mobile device is received by the transmission section, a sensory signal sensible for humans is output from the indication section. An input device has an actuation section. When an actuation signal corresponding to the indication signal is received by the input device, the actuation section outputs a start signal to the host computer, and then the host computer executes the start event according to the start signal.

One input method provided by the instant disclosure is adapted for a computer input apparatus. The computer input apparatus is used for making a host computer execute a start event according to an instruction of a mobile device. The computer input apparatus includes a mouse pad and an input device. The input method includes: outputting a sensory signal sensible for humans by an indication section of the mouse pad when the mouse pad receives an indication signal from the mobile device; and outputting a start signal to the host computer by an actuation section of the input device when the input device receives an actuation signal corresponding to the indication signal, to make the host computer execute the start event according to the start signal.

Another input method provided by the instant disclosure is also adapted for a computer input apparatus. The computer input apparatus is used for making a host computer execute a start event according to an instruction of a mobile device. The computer input apparatus includes a mouse pad and an input device. The input method includes: outputting a sensory signal sensible for humans by an indication section of the mouse pad when the mouse pad receives an indication signal from the mobile device; and outputting a start signal to the mobile device from an actuation section of the input device for executing the start event according to the start signal when the input device receives an actuation signal corresponding to the indication signal.

To sum up, in the computer input system provided by the instant disclosure, when there is one of predetermined key words detected in the contents displayed by the mobile device, the computer input apparatus receives a signal from the mobile device as a reminder. The computer input apparatus then generates a response to notify a user. Thus, the user can operate the computer input apparatus to make the host computer execute a preset start event. In brief, by using the computer input system provided by the instant disclosure, the start event can be executed conveniently and immediately by the host computer, and be relevant to the information received from an external device, such as a mobile device.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EXEMPLARY EMBODIMENTS

A computer input system is provided by the instant disclosure. The computer input system includes, for example, a mobile device, a computer input apparatus and a host computer. When contents displayed by the mobile device cause a trigger condition of the mobile device to occur, the mobile device outputs a signal to the computer input apparatus, and accordingly the computer input apparatus generates a response as a reminder to a user. According to the reminder, the user can operate the computer input apparatus so that the host computer executes a preset start event. Thus, by using the computer input apparatus provided by the instant disclosure, the host computer can execute the start event which is relevant to the contents displayed by the mobile device. Even if the user is using his personal computer and cannot immediately notice newly pushed contents or newly received messages displayed by his mobile device, the user can still learn from the computer input apparatus that new information has been received by his mobile device. Then, the user can respond to the newly pushed contents or messages displayed by his mobile device via his personal computer.

One Embodiment of the Computer Input System

Figure 1:
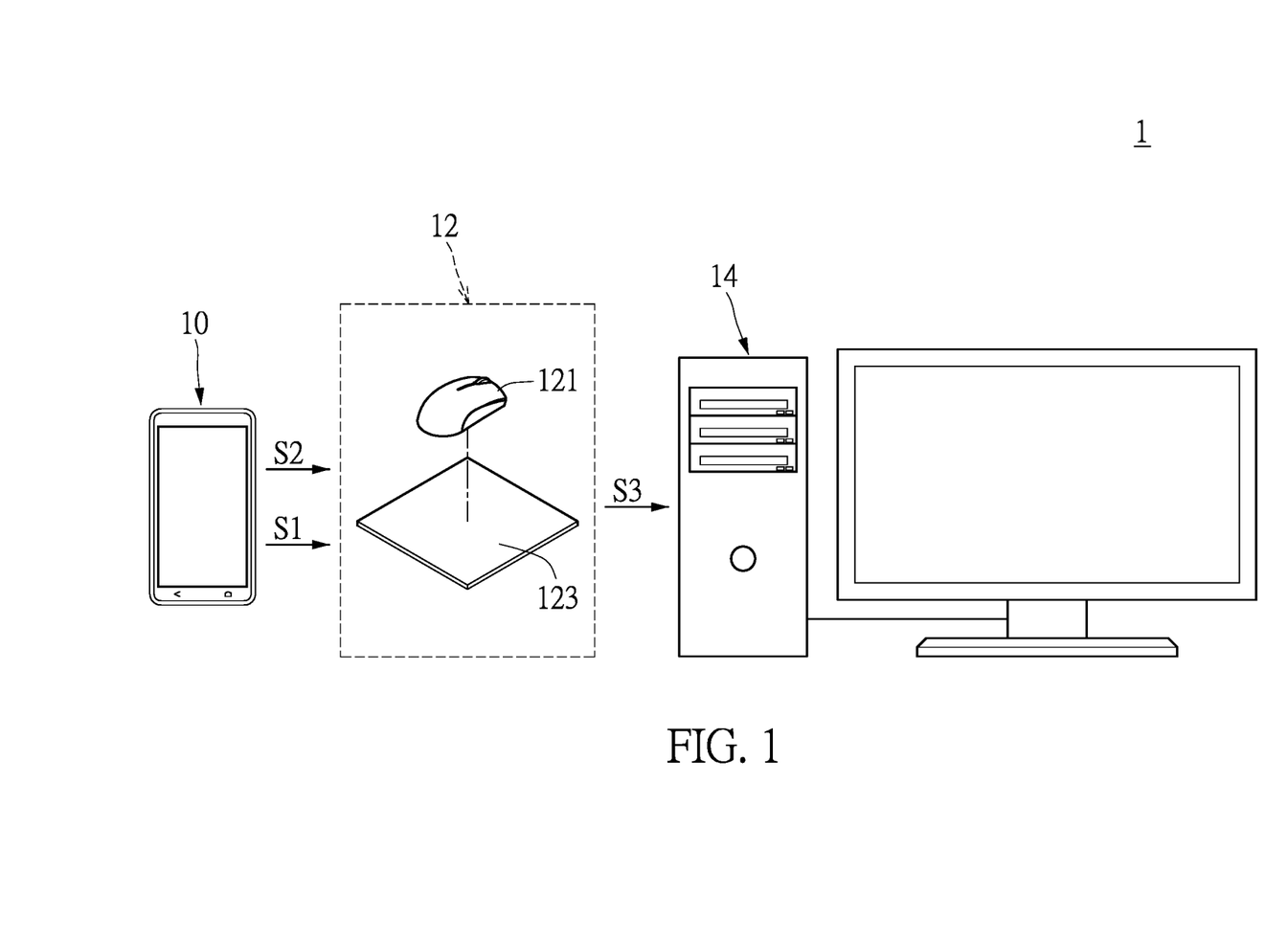
FIG. 1 shows a schematic diagram of a computer input system of one embodiment of the instant disclosure.

Referring to FIG. 1, a computer input system 1 includes a mobile device 10, a computer input apparatus 12 and a host computer 14. For easy reference, an input device 121 and a mouse pad 123 are taken as examples of the computer input apparatus 12. In one embodiment, the computer input apparatus 12 can receive an indication signal S1 and an actuation signal S2 output from the mobile device 10, and the computer input apparatus 12 can output a start signal S3 to the host computer 14.

When there is a predetermined keyword in the contents currently displayed by the mobile device 10, the mobile device 10 outputs the indication signal S1 and the actuation signal S2 to the computer input apparatus 12. When the computer input apparatus 12 receives the indication signal S1, the computer input apparatus 12, such as the mouse pad 123, can output a sensory signal to aware a user. The sensory signal can be, for example, a light signal, a display signal, a voice signal or a combination thereof. When the computer input apparatus 12 receives the actuation signal S2, the input device 121 can output a start signal S3 to the host computer 14 according to the user's operation. As mentioned, the input device 121 and the mouse pad 123 are taken as examples of the computer input apparatus 12, and for ease of illustration, a wireless mouse is taken as an example of the input device 121 in the following description. When the host computer 14 receives the start signal S3, the host computer 14 can execute a start event corresponding to the keyword in the contents displayed by the mobile device 10. For example, the start event executed by the host computer 14 can be an application or a game program.

In practice, to determine whether there is a predetermined keyword in the contents currently displayed by the mobile device 10 is to determine whether there is a predetermined keyword detected in the contents displayed by the mobile device 10 when the mobile device 10 executes a social application, such as Facebook, Twitter, Plurk, Weibo, or the like. In addition, the mobile device 10 can be, for example, a mobile phone, a tablet or a laptop.

Another Embodiment of the Computer Input System

Figure 2A:
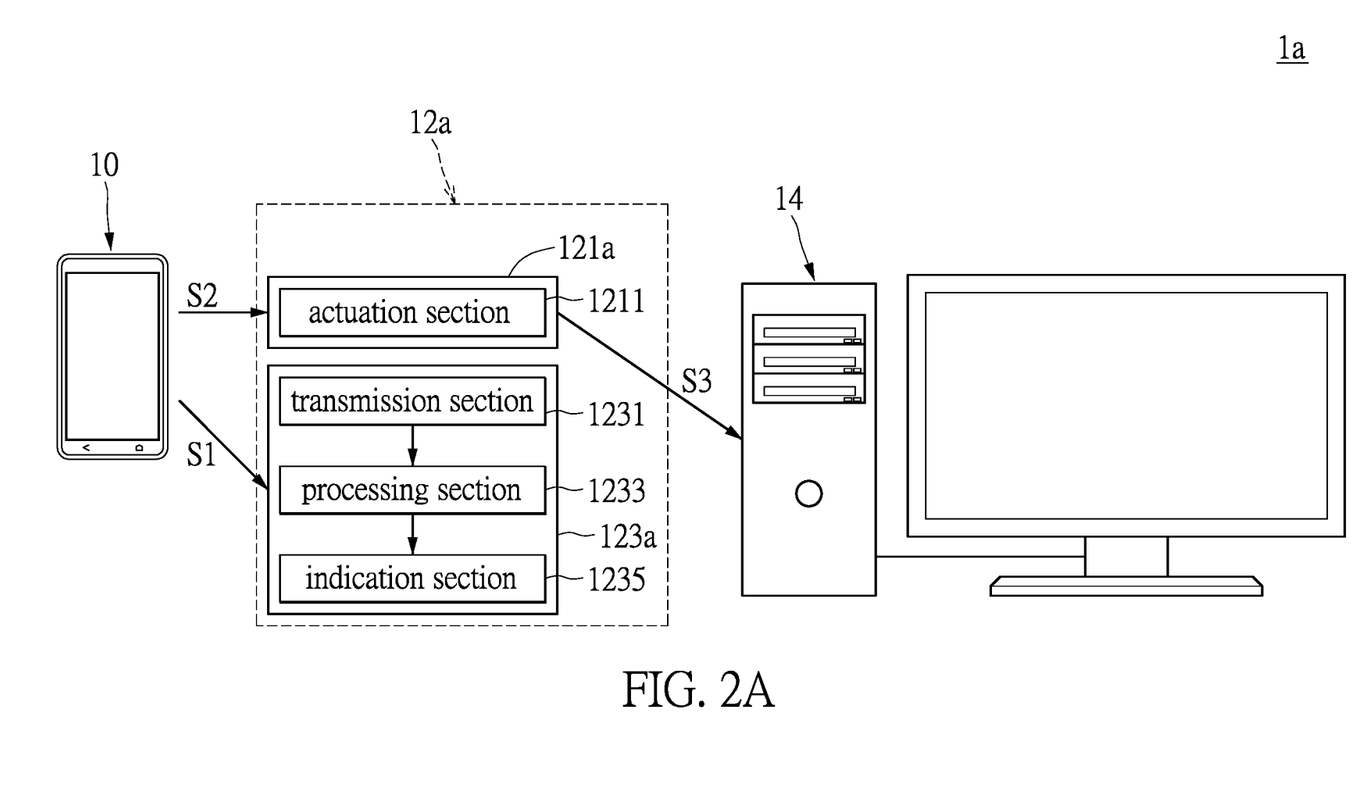
FIG. 2A shows a block diagram of a computer input system of one embodiment of the instant disclosure.

Referring to FIG. 2A, the computer input system 1a in this embodiment includes a mobile device 10, a computer input apparatus 12a and a host computer 14. For ease of illustration, a wireless mouse 121 and a mouse pad 123a are taken as examples of the computer input apparatus 12a. The wireless mouse 121a has an actuation section 1211. The actuation section 1211 can be turned on when the wireless mouse 121a receives an actuation signal. As known by the skilled in the art, in addition to the actuation section 1211, the wireless mouse 121 also includes other circuits, such as a processing circuit, a wireless circuit, a displacement detection circuit, and the like; however, only the actuation section 1211 is described in the following description for the sake of relevance. When the actuation section 1211 is turned on, the user can operate the actuation section 1211 such that the wireless mouse 121a outputs a start signal S3 to the host computer 14. The actuation section 1211 can be a keying circuit. In this case, when the wireless mouse 121a receives the actuation signal S2 and when the keying circuit detects a pressing action of a user, the keying circuit outputs the start signal S3 to the host computer 14. The actuation section 1211 can also be a sensing circuit. In this case, when the wireless mouse 121a receives the actuation signal S2 and when the sensory signal output from the wireless mouse 121a is detected by the sensing circuit, the sensing circuit outputs the start signal S3 to the host computer 14. For example, the sensing circuit can be a barcode scanner or a photo sensor.

The mouse pad 123a has a transmission section 1231, a processing section 1233 and an indication section 1235. The processing section 1233 is connected to the transmission section 1231 and the indication section 1235. The transmission section 1231 is configured for the wireless mouse 123a to transmit signals to or receive signals from external devices wirelessly. When the processing section 1233 receives the indication signal S1 from the transmission section 1231, the processing section 1233 controls the indication section 1235 to output the sensory signal. The transmission section 1231 can be, for example, a wireless circuit, and the wireless circuit can be a Bluetooth circuit or a Radio frequency circuit. The processing section 1233 can be, for example, a processor or a controller having an operation processing ability. The indication section 1235 can be, for example, a light emitting circuit, a display circuit, a voice output circuit or a combination thereof, and thus the sensory signal can be a light signal provided by the light emitting circuit, a display signal provided by the display circuit or a voice signal provided by the voice output circuit.

Figure 2B:
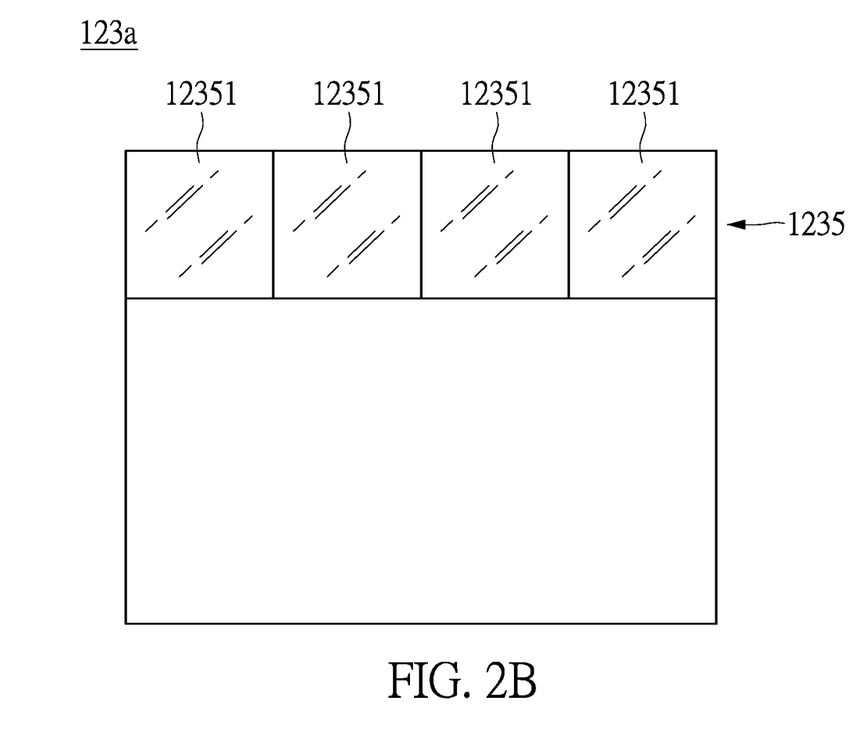
FIG. 2B shows a schematic diagram of a mouse pad of one embodiment of the instant disclosure.

Referring to FIG. 2B, the indication section 1235 of the mouse pad 123a is shown as a light emitting circuit. This light emitting circuit has a plurality of light emitting blocks 12351, and the light emitting blocks 12351 can emit light in different colors. In practice, according to different key words relevant to various contents displayed by the mobile device 10, the mobile device 10 correspondingly outputs various indication signals and various actuation signals. For example, when one of key words, such as a first key word, is detected in the contents currently displayed by the mobile device 10, the mobile device 10 outputs a first indication signal as the indication signal and outputs a first actuation signal as the actuation signal. According to the first indication signal, the mouse pad 123a makes a first light emitting block among the light emitting blocks 12351 emit a light having a specific color that does or does not flash. When the actuation section 1211 of the wireless mouse 121a is a keying circuit, according to the received first actuation signal, the wireless mouse 121a allows a first key or a first set of keys to be pressed by the user to output a first start signal to the host computer 14. When the actuation section 1211 of the wireless mouse 121a is a photo sensor, according to the received first actuation signal, the wireless mouse 121a turns on the photo sensor. When the light emitted by the first light emitting block of the mouse pad 123a is detected by the photo sensor of the wireless mouse 121a, the wireless mouse 121a correspondingly outputs a first start signal to the host computer 14. When the first start signal is received by the host computer 14, the host computer 14 automatically executes a start event corresponding to the first start signal.

Likewise, when another key word, such as a second key word, is detected in the contents currently displayed by the mobile device 10, the mobile device 10 outputs a second indication signal as the indication signal and outputs a second actuation signal as the actuation signal to make a second light emitting block of the mouse pad 123a emit a light. According to the user's operation, the keying circuit of the wireless mouse 121a can output a second start signal to the host computer 14, or the wireless mouse 121a can output a second start signal when the light emitted by the second light emitting block of the mouse pad 123a is detected by the photo sensor of the wireless mouse 121a. Finally, when the host computer 14 receives the second start signal, the host computer 14 automatically executes a second start event corresponding to the second start signal. Likewise, when still another key word, such as a third key word, is detected in the contents currently displayed by the mobile device 10, the computer input system works similarly, and thus further description thereon is omitted.

It is worth mentioning that, if the wireless mouse 121a has not received the actuation signal S2, the function to output a start signal S3 of the wireless mouse 121a is shut down by the actuation section 1211. For example, when the actuation section 1211 is a keying circuit and if the wireless mouse 121a has not received the actuation signal S2, the keying circuit can work as usual to perform functions other than outputting a start signal S3.

Figure 2C:
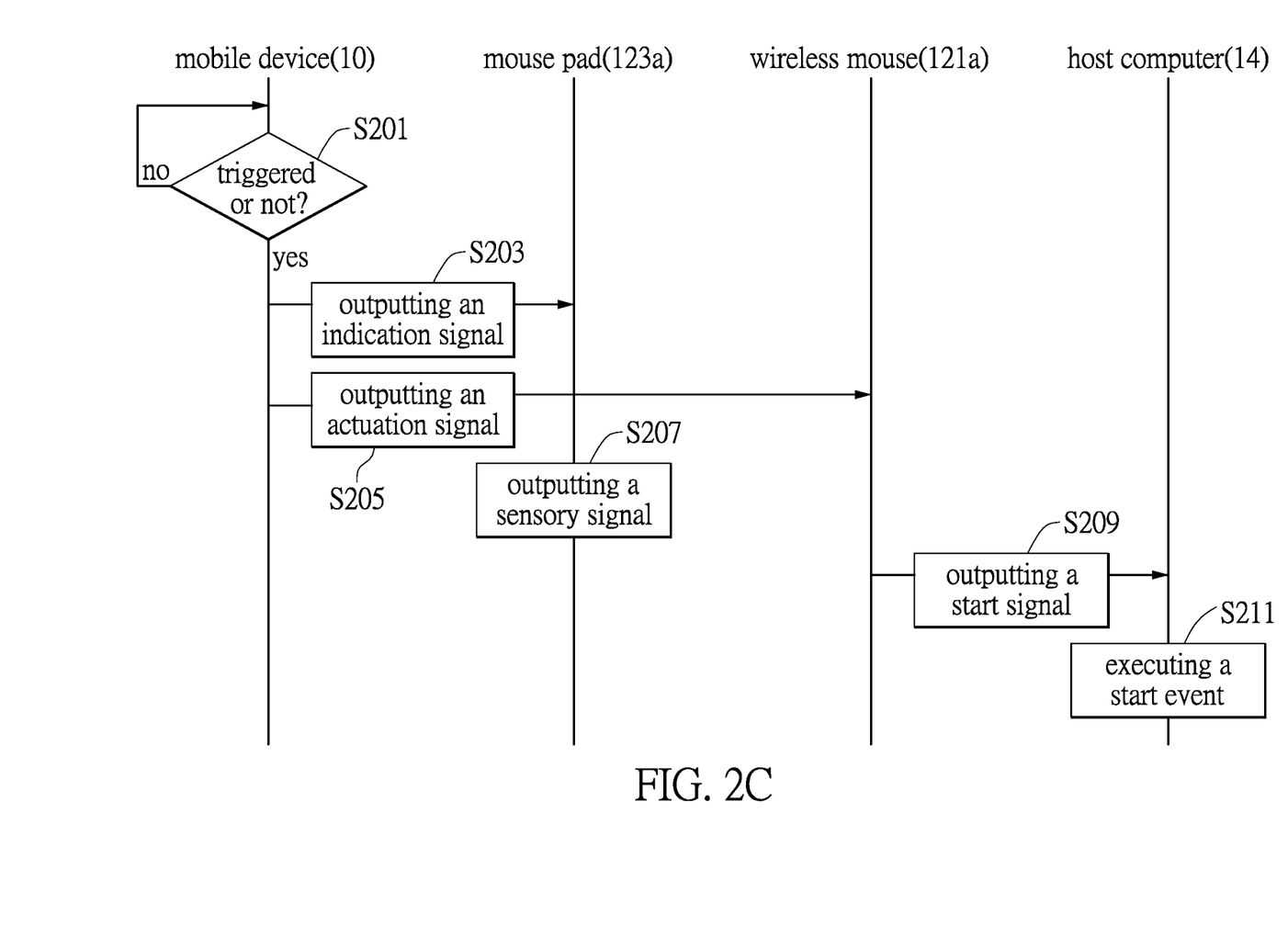
FIG. 2C shows a flow chart illustrating how the computer input system in FIG. 2A operates.

Referring to FIG. 2C, and with further reference to FIG. 2A, the input method of the computer input apparatus provided in this embodiment is to make a host computer 14 execute a corresponding start event according to an instruction output from a mobile device 10. The input method shown in FIG. 2C can be executed by the computer input system shown in FIG. 2A.

Step S201 is to determine whether the mobile device 10 is triggered. In one embodiment, an application can be installed in the mobile device 10 to determine whether there is a predetermined key word detected in the contents currently displayed by the mobile device 10, which is defined as a trigger condition of the mobile device 10. In addition, when it is determined that there is a predetermined key word detected in the contents currently displayed by the mobile device 10 (in other words, when the trigger condition occurs), the mobile device 10 is triggered by this application.

When the trigger condition of the mobile device 10 occurs, the mobile device 10 outputs an indication signal S1 to the mouse pad 123a as shown in step S203, and outputs an actuation signal S2 to the wireless mouse 121a as shown in step S205.

When the mouse pad 123a receives the indication signal S1, the indication section 1235 of the mouse pad 123a outputs a sensory signal as shown in step S207.

When the wireless mouse 121a receives the actuation signal S2, the actuation section 1211 of the wireless mouse 121a is turned on. The user can be made aware that the actuation section 1211 of the wireless mouse 121a has been turned on by a sensory signal displayed by the indication section 1235 of the mouse pad 123a. After that, when the user's operation is detected by the actuation section 1211 of the wireless mouse 121a, the wireless mouse 121a outputs a start signal S3 to the host computer 14 as shown in step S209.

When the host computer 14 receives the start signal S3, the host computer 14 executes a start event as shown in step S211, such that the host computer 14 can provide a prompt response corresponding to a predetermined key word detected in the contents displayed by the mobile device 10.

Another Embodiment of the Computer Input System

Figure 3A:
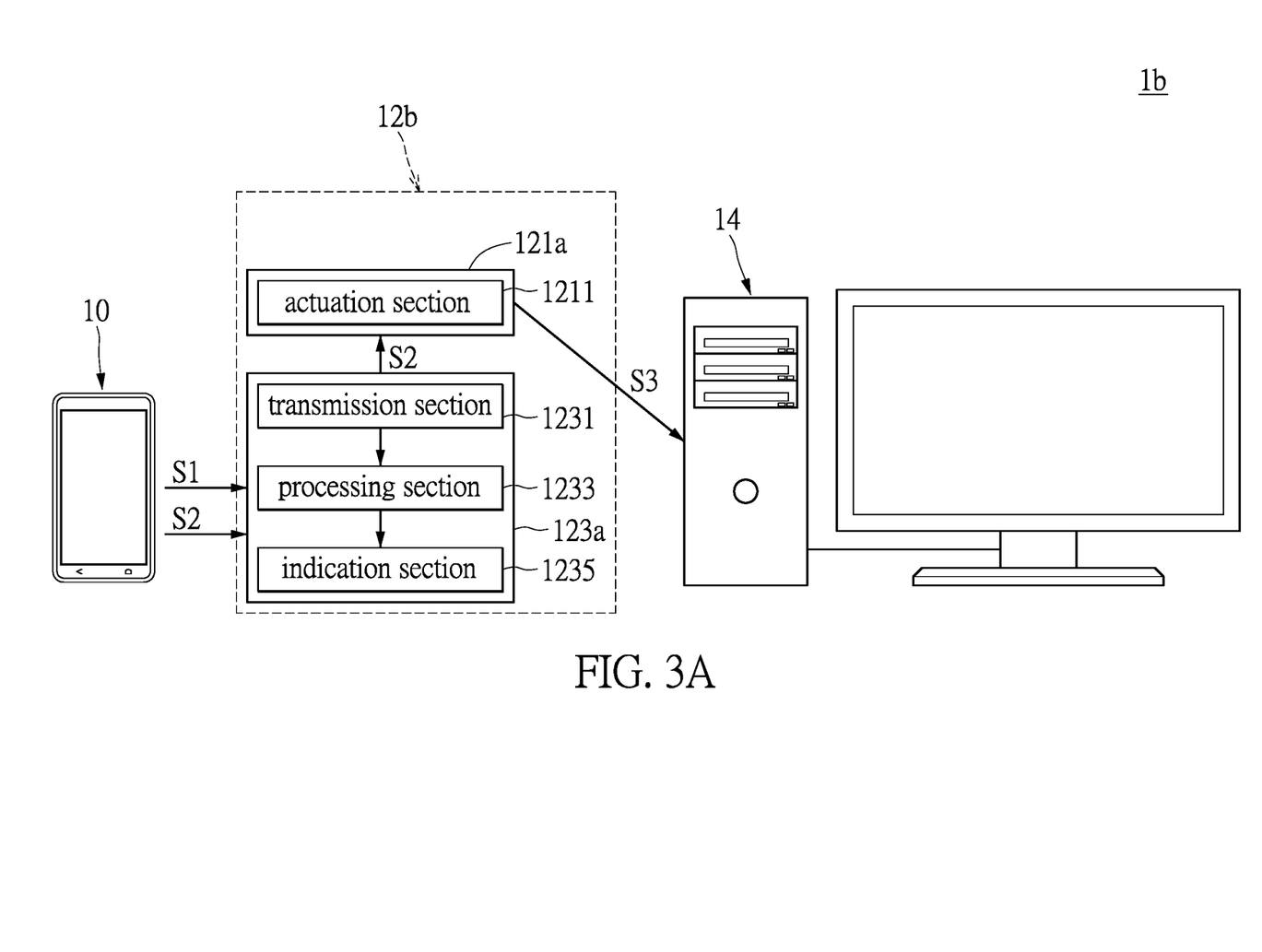
FIG. 3A shows a block diagram of a computer input system of another embodiment of the instant disclosure.

Referring to FIG. 3A, the computer input system 1b in this embodiment includes a mobile device 10, a computer input apparatus 12 and a host computer 14. The difference between the computer input system 1b shown in FIG. 3A and the computer input system 1a shown in FIG. 2A is that, after the mobile device 10 outputs an indication signal S1 and an actuation signal S2, the computer input systems 1a and 1b work differently, as illustrated by the following description.

In the computer input apparatus 12b shown in FIG. 3A, the mouse pad 123a receives an indication signal S1 and an actuation signal S2 output from the mobile device 10, and then the mouse pad 123a outputs an actuation signal S2 to the wireless mouse 121a.

Figure 3B:
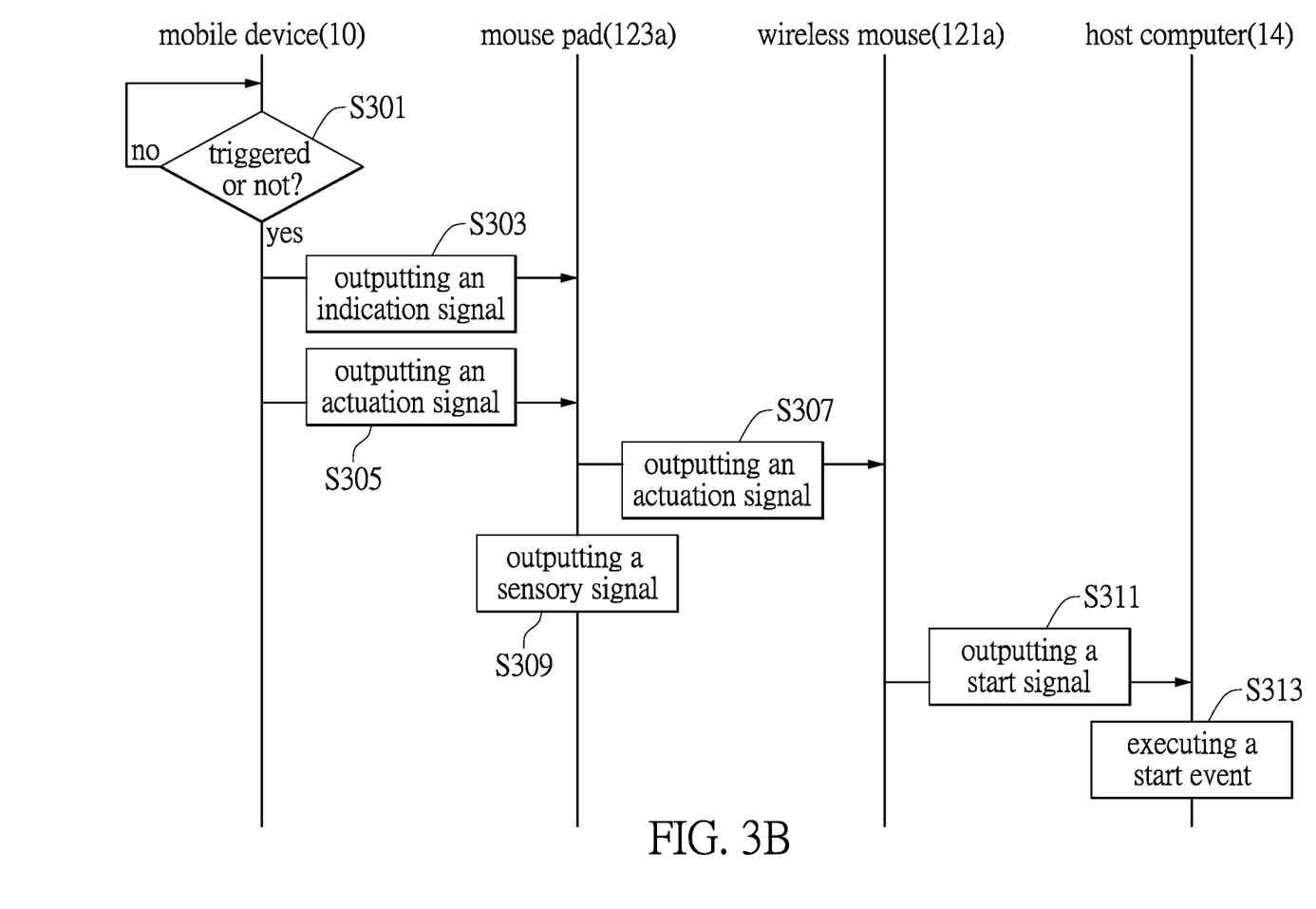
FIG. 3B shows a flow chart illustrating how the computer input system in FIG. 3A operates.

Referring to FIG. 3B, and with further reference to FIG. 3A, the input method of the computer input apparatus provided in this embodiment is to make a host computer 14 execute a corresponding start event according to an instruction from a mobile device 10. The input method shown in FIG. 3B can be executed by the computer input system shown in FIG. 3A.

Step S301 is to determine whether the mobile device 10 is triggered. An application can be installed in the mobile device 10 to determine whether there is a predetermined key word detected in the contents currently displayed by the mobile device 10, which is defined as a trigger condition of the mobile device 10. In addition, when it is determined that there is a predetermined key word detected in the contents currently displayed by the mobile device 10 (in other words, when the trigger condition occurs), the mobile device 10 is triggered by this application.

When the trigger condition of the mobile device 10 occurs, the mobile device 10 outputs an indication signal S1 to the mouse pad 123a as shown in step S303, and outputs an actuation signal S2 to the mouse pad 123a as shown in step S305.

When the mouse pad 123a receives the indication signal S1 and the actuation signal S2, the mouse pad 123a outputs an actuation signal S2 to the wireless mouse 121a as shown in step S207, and the indication section 1235 of the mouse pad 123a outputs a sensory signal as shown in step S209.

When the wireless mouse 121a receives the actuation signal S2, the actuation section 1211 of the wireless mouse 121a is turned on. At the same time, the user can notice that the actuation section 1211 of the wireless mouse 121a has been turned on according to the sensory signal displayed by the indication section 1235 of the mouse pad 123a. After that, when the user's operation is detected by the actuation section 1211 of the wireless mouse 121a, the wireless mouse 121a outputs a start signal S3 as shown in step S411 to the host computer 14.

When the host computer 14 receives the start signal S3, the host computer 14 executes a start event as shown in step S313, such that the host computer 14 can provide a prompt response corresponding to a predetermined key word detected in the contents displayed by the mobile device 10.

Still Another Embodiment of the Computer Input System

Figure 4A:
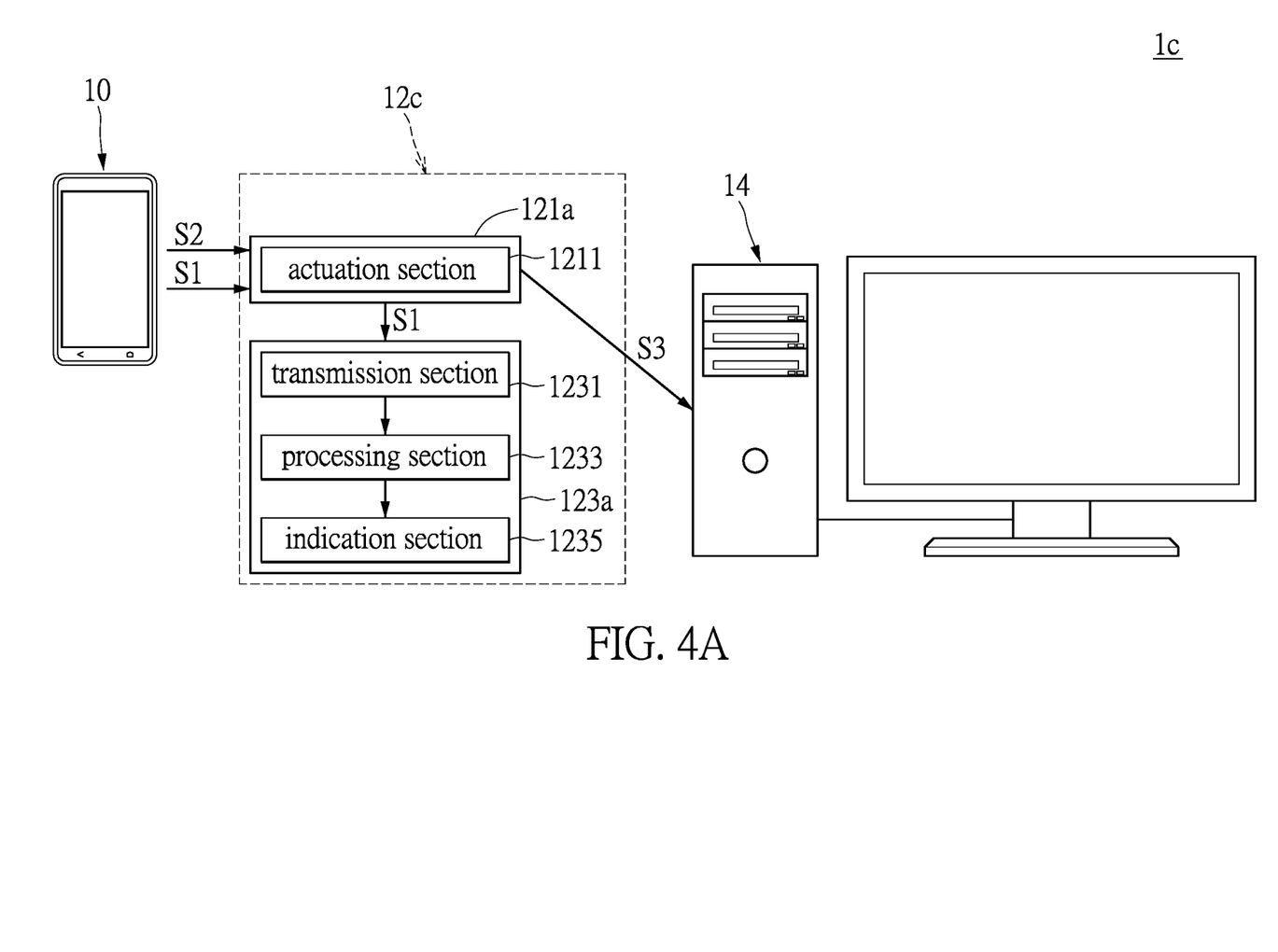
FIG. 4A shows a block diagram of a computer input system of another embodiment of the instant disclosure.

Referring to FIG. 4A, the computer input system 1c in this embodiment includes a mobile device 10, a computer input apparatus 12c and a host computer 14. The difference between the computer input system 1c shown in FIG. 4A and the computer input system 1a shown in FIG. 2A is that, after the mobile device 10 outputs an indication signal S1 and an actuation signal S2, the computer input systems 1a and 1c work differently, as illustrated by the following description.

A wireless mouse 121a and a mouse pad 123a are taken as examples of the computer input apparatus 12c shown in FIG. 4A. The wireless mouse 121a receives an indication signal S1 and an actuation signal S2 from a mobile device 10, and then the wireless mouse 121a outputs the indication signal S1 to the mouse pad 123a.

Figure 4B:
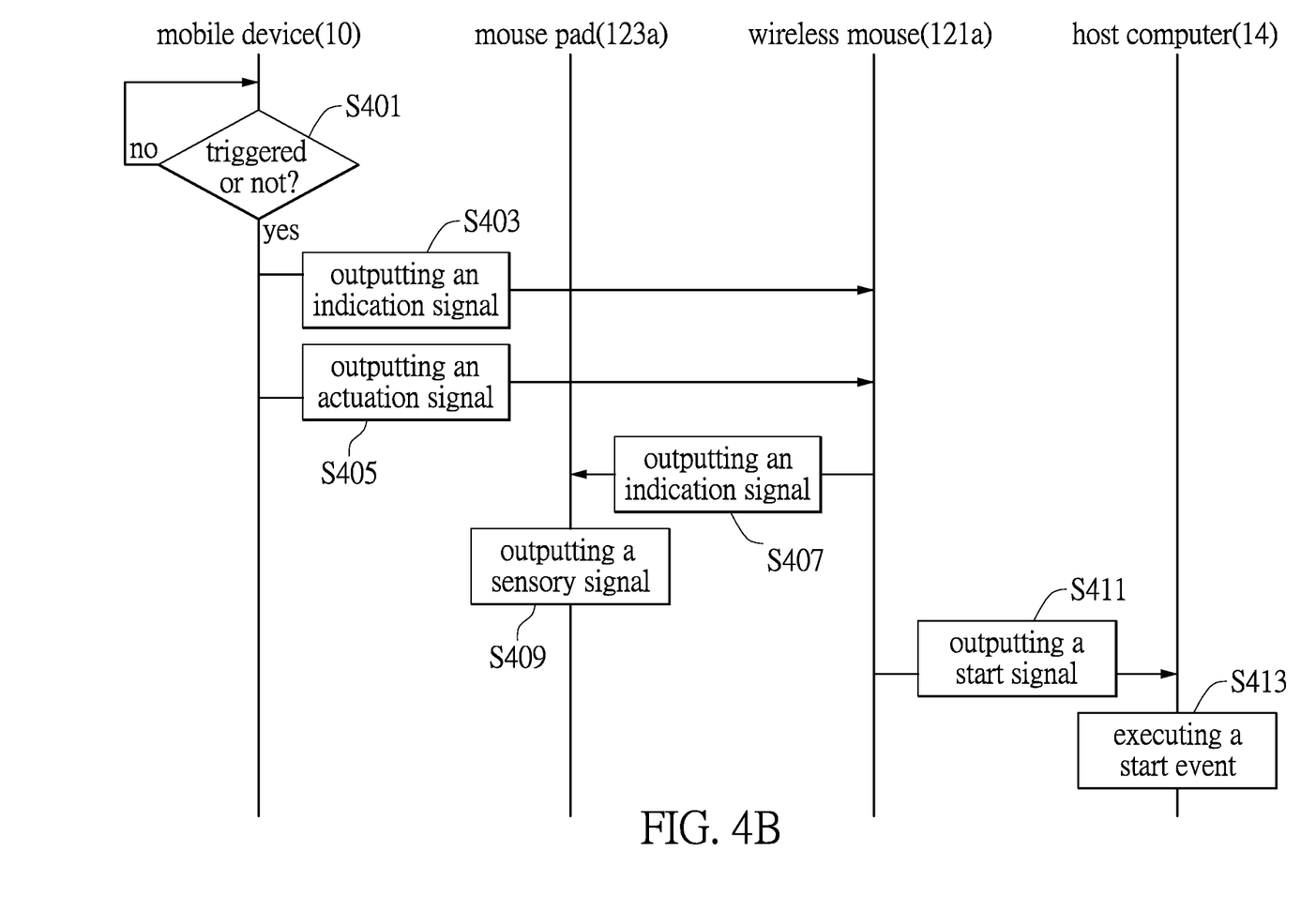
FIG. 4B shows a flow chart illustrating how the computer input system in FIG. 4A operates.

Also referring to FIG. 4B, the input method of the computer input apparatus provided in this embodiment is to make a host computer 14 execute a corresponding start event according to an instruction from a mobile device 10, and this input method can be illustrated by FIG. 4A and FIG. 4B. The input method shown in FIG. 4B can be executed by the computer input system shown in FIG. 4A.

Step S401 is to determine whether the mobile device 10 is triggered. In one embodiment, an application can be installed in the mobile device 10 to determine whether there is a predetermined key word detected in the contents currently displayed by the mobile device 10. When it is determined that there is a predetermined key word detected in the contents currently displayed by the mobile device 10 (in other words, when the trigger condition occurs), the mobile device 10 is triggered by this application.

When the trigger condition of the mobile device 10 occurs, the mobile device 10 outputs the indication signal S1 to the wireless mouse 121a as shown in step S403, and outputs the actuation signal S2 to the wireless mouse 121a as shown in step S405.

When the wireless mouse 121a receives the indication signal S1 and the actuation signal S2, the wireless mouse 121a outputs the indication signal S1 to the mouse pad 123a as shown in step S407.

When the mouse pad 123a receives the indication signal S1, the indication section 135 of the mouse pad 123a outputs a sensory signal as shown in step S409.

When the wireless mouse 121a receives the actuation signal S2, the actuation section 1211 of the wireless mouse 121a is turned on. At the same time, the user can notice that the actuation section 1211 of the wireless mouse 121a has been turned on according to the sensory signal displayed by the indication section 1235 of the mouse pad 123a. After that, when the user's operation is detected by the actuation section 1211 of the wireless mouse 121a, the wireless mouse 121a outputs a start signal S3 to the host computer 14 as shown in step S411.

When the host computer 14 receives the start signal S3, the host computer 14 can execute a start event, as shown in step S413, to make a prompt response according to the contents displayed by the mobile device 10. The contents displayed by the mobile device 10 contain one of predetermined key words.

It is worth mentioning that, in this embodiment, if the computer input apparatus has output a start signal to the host computer or if the host computer has executed a start event, the computer input apparatus or the host computer can transmit a report signal to the mobile device. According to the report signal, the mobile device can learn that the computer input apparatus or the host computer has made a certain response. Additionally, if necessary, the mobile device can transmit a stop signal to the computer input apparatus, such that the actuation section of the input apparatus stops outputting the start signal and the indication section of the mouse pad stops outputting the sensory signal.

As mentioned above, in this embodiment, the start signal S3 is output from the input device to the host computer. However, in another embodiment, the start signal S3 can also be output from the input device to the mobile device. When the mobile device receives the start signal S3, the mobile device 10 can execute a start event which is relevant to the predetermined key word detected in the contents displayed by the mobile device 10. For example, the start event executed by the mobile device 10 can be a specific application or a game program.

To sum up, in the computer input system provided by the instant disclosure, when there is one of predetermined key words detected in the contents displayed by the mobile device, the computer input apparatus receives a signal from the mobile device as a reminder. After that, the computer input apparatus generates a response to notify a user. Thus, the user can operate the computer input apparatus so that the host computer executes a preset start event. In brief, by using the computer input system provided by the instant disclosure, the start event executed conveniently and immediately by the host computer, and can be relevant to the information received by an external device, such as a mobile device.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A computer input apparatus, for making a host computer execute a start event according to an instruction of a mobile device, comprising:
   a mouse pad, having a wireless circuit and a light emitting circuit, wherein the wireless circuit is configured to receive an indication signal provided by the mobile device, and the light emitting circuit is configured to output a light signal sensible for humans according to the indication signal; and
   a mouse, having a photo sensor, wherein the mouse is configured to receive an actuation signal provided by the mobile device to turn on the photo sensor, and the photo sensor is configured to detect the light signal output from the light emitting circuit;
   wherein when a triggering condition occurs, the mobile device outputs the indication signal to the mouse pad and the actuation signal to the mouse, and the triggering condition is that there is a predetermined key word detected in contents displayed by the mobile device executing a social application using an application installed in the mobile device to determine whether the predetermined key word being detected;
   wherein when the mouse receives the actuation signal to turn on the photo sensor and when the light signal output from the light emitting circuit is detected by the photo sensor, then the photo sensor outputs a start signal to the host computer according to a user's operation, and the host computer executes the start event according to the start signal, wherein the actuation signal is corresponding to the indication signal;
   wherein the mouse pad further has a processing section and the processing section is connected to the wireless circuit and the light emitting circuit, and wherein when the processing section receives the indication signal from the wireless circuit, the processing section controls the light emitting circuit to output the light signal;
   wherein if the photo sensor outputs the start signal to the host computer or if the host computer executes the start event, the host computer transmits a report signal to the mobile device; and the mobile device transmits a stop signal to the computer input apparatus, such that the photo sensor stops outputting the start signal and the light emitting circuit stops outputting the light signal;

wherein the mobile device correspondingly outputs the indication signal and the actuation signal according to one of predetermined key words displayed by the mobile device;

wherein the mouse pad has a plurality of light emitting blocks, the mouse pad makes one of the plurality of light emitting blocks emit a light according to the indication signal.

2. An input method of a computer input apparatus, the computer input apparatus being used for making a host computer execute a start event according to an instruction of a mobile device, the computer input apparatus including a mouse pad and a mouse, and the input method comprising:

outputting a light signal sensible for humans by an light emitting circuit of the mouse pad when the mouse pad receives an indication signal provided by the mobile device; and when the mouse receives an actuation signal provided by the mobile device to turn on a photo sensor of the mouse and when the light signal is detected by the photo sensor, then outputting a start signal to the host computer by the photo sensor according to a user's operation, to make the host computer execute the start event according to the start signal;

wherein the actuation signal is corresponding to the indication signal;

wherein the mouse receives the actuation signal and the light signal output from the light emitting circuit is detected by the photo sensor, the photo sensor outputs the start signal to the host computer;

wherein when a triggering condition occurs, the mobile device outputs the indication signal to the mouse pad and the actuation signal to the mouse, and wherein the triggering condition is that there is a predetermined key word detected in contents displayed by the mobile device executing a social application using an application installed in the mobile device to determine whether the predetermined key word being detected;

wherein if the photo sensor outputs the start signal to the host computer or if the host computer executes the start event, the host computer transmits a report signal to the mobile device; and the mobile device transmits a stop signal to the computer input apparatus, such that the photo sensor stops outputting the start signal and the light emitting circuit stops outputting the light signal;

wherein the mobile device correspondingly outputs the indication signal and the actuation signal according to one of predetermined key words displayed by the mobile device;

wherein the mouse pad has a plurality of light emitting blocks, the mouse pad makes one of the plurality of light emitting blocks emit a light according to the indication signal.

3. The input method according to claim 2, wherein the start event is the host computer executing a game program.

* * * * *